United States Patent
Bolukbasi et al.

(10) Patent No.: US 6,620,484 B1
(45) Date of Patent: Sep. 16, 2003

(54) VARIABLE DENSITY STITCHED-COMPOSITE STRUCTURAL ELEMENTS FOR ENERGY ABSORPTION

(75) Inventors: Akif O. Bolukbasi, Phoenix, AZ (US); Joyanto Kumar Sen, Scotsdale, AZ (US)

(73) Assignee: The Boeing Company, Chicago, IL (US)

( * ) Notice: Subject to any disclaimer, the term of this patent is extended or adjusted under 35 U.S.C. 154(b) by 141 days.

(21) Appl. No.: 09/587,796

(22) Filed: Jun. 6, 2000

(51) Int. Cl.$^7$ ................................................ B32B 3/06
(52) U.S. Cl. ........................................ 428/102; 244/123
(58) Field of Search .............................. 428/102, 113; 244/123

(56) References Cited

U.S. PATENT DOCUMENTS

| | | | | |
|---|---|---|---|---|
| 4,206,895 A | * | 6/1980 | Olez | ........................ 244/123 |
| 4,299,871 A | | 11/1981 | Forsch | |
| 4,331,495 A | | 5/1982 | Lackman et al. | |
| 4,407,885 A | | 10/1983 | Murphy et al. | |
| 4,774,120 A | * | 9/1988 | Vees et al. | .................. 428/102 |
| 5,429,853 A | * | 7/1995 | Darrieux | ..................... 428/102 |
| 5,619,748 A | | 4/1997 | Nelson et al. | |

* cited by examiner

Primary Examiner—Harold Pyon
Assistant Examiner—Jane Rhee
(74) Attorney, Agent, or Firm—Harness Dickey & Pierce P.L.C.

(57) ABSTRACT

An energy absorbing stitched-composite structural element is provided having a glass thread stitched therethrough. The stitching pattern of the thread varies in density from a low-density portion at an initial impact portion of the panel to a high density portion at a final impact portion of the panel. Preferably, the stitch pattern includes a plurality of rows laterally spaced apart relative to the height of the panel. The spacing between adjacent rows progressively decreases from the initial impact portion of the panel to the final impact portion of the panel. Alternatively, or in combination therewith, the number of stitches per row varies from the fewest number of stitches proximate the initial impact portion of the panel to the final impact portion of the panel. In a highly preferred embodiment of the present invention, the stitched composite panel is incorporated into the subfloor structure of an aircraft fuselage.

4 Claims, 2 Drawing Sheets

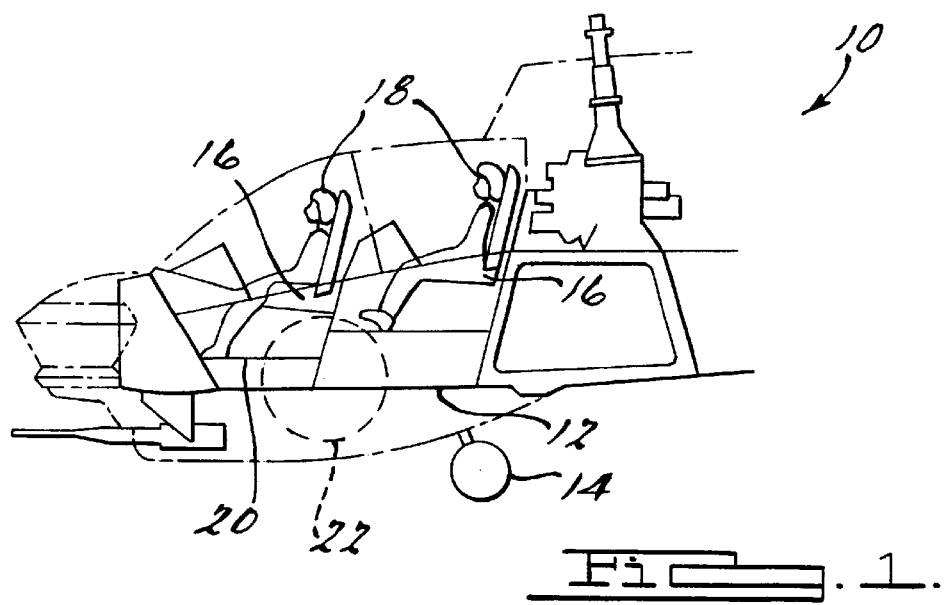
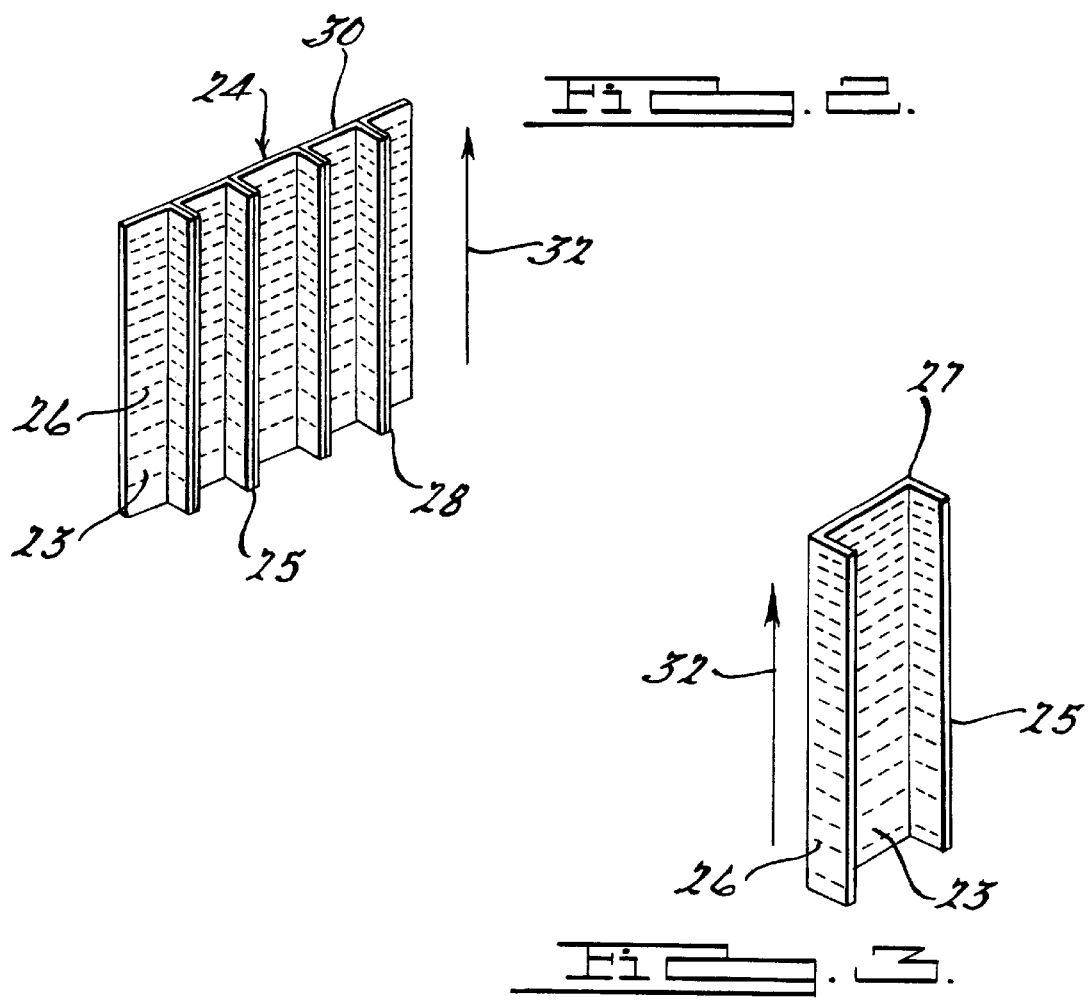

VARIABLE DENSITY STITCHED-COMPOSITE STRUCTURAL ELEMENTS FOR ENERGY ABSORPTION

BACKGROUND OF THE INVENTION

1. Technical Field

The present invention generally relates to energy absorbing structural panels for aircraft and the like, and more particularly, to a variable density stitched-composite structural element.

2. Discussion

Modern military and civilian aircraft, and other types of vehicles, commonly include components which are designed to provide enhanced protection of the vehicle occupants during a crash. The ultimate goal of such crash protective components is to minimize the number of injuries to the occupants in survivable crash impacts. A secondary goal of such crash protective components is to maximize the structural integrity of the vehicle during normal or non-impact operation.

Aircraft design for crashworthiness involves a systems approach. In this approach, all of the aircraft components combine to yield crash protection for the occupants. For example, the fuselage structure, landing gear, and seats work together during a crash to absorb the aircraft kinetic energy. Ideally, the system operates to slow the occupants to rest without injurious loading during a crash. The energy-absorbing structure in an aircraft, generally located below the fuselage floor, is a very important part of this crash energy absorption system. In fact, this structure may absorb up to 8% of the aircraft kinetic energy during a crash.

While early generation crash energy absorption systems included mostly metal components, composite materials are now being applied to aircraft fuselage structures. Such composite materials offer potentially significant weight and cost reductions relative to metallic structures. However, composite materials are typically brittle and do not exhibit either plasticity or high elongation prior to failure. This may compromise the crashworthy design of an aircraft employing such composite components.

To enhance the energy absorption of composite components, a number of design solutions have been proposed. These design solutions include various crush initiators as well as ply drop-offs to sustain the crushing process after initiation. The drawback with these existing design solutions is that they are difficult to incorporate into the manufacturing process without significant cost increases.

Recently, stitched-composite materials have been applied to aircraft fuselage structures to offer additional benefits over non-stitched composites. Such benefits include superior damage tolerance and compression-after-impact capabilities. These improvements are provided due to the presence of aramid or glass thread stitches through the thickness of the laminates making up the composite structure.

Unfortunately, a drawback of stitched-composite structures is that the presence of the stitching may inhibit delamination which is part of the crushing process. Further, crush initiators and ply drop-offs which have been successfully incorporated into non-stitched composites may not work with stitched composites since the presence of the stitches significantly affects initiation and progression of the energy absorption process. Unless special design approaches are taken, stitched-composite subfloor structures may start to crush at higher loads that can subsequently precipitate unstable crushing due to elastic instability of the structure. This may result in reduced energy absorption.

In view of the foregoing, it would be desirable to provide a stitched-composite structural element for enabling a stable crushing process that starts at lower load levels, does not precipitate elastic instability, and ensures energy absorption by progressive delamination, bending, and fracture of the composite plies. This would result in load-crushing characteristics that maximize the energy absorption of the structural element.

SUMMARY OF THE INVENTION

The above and other objects are provided by an energy absorbing stitched-composite structural element. The element includes a composite substrate having a glass thread stitched therethrough. The stitching pattern of the thread varies in density from a low-density portion at an initial impact portion of the panel to a high density portion at a final impact portion of the panel. Preferably, the stitch pattern includes a plurality of rows laterally spaced apart relative to the height of the panel. The spacing between adjacent rows progressively decreases from the initial impact portion of the panel to the final impact portion of the panel. Alternatively, or in combination therewith, the number of stitches in each row varies from the fewest number of stitches proximate the initial impact portion of the panel to the greatest number of stitches proximate the final impact portion of the panel. In a highly preferred embodiment of the present invention, the stitched composite panel is incorporated into the subfloor structure of an aircraft fuselage.

BRIEF DESCRIPTION OF THE DRAWINGS

The various advantages of the present invention will become apparent to one skilled in the art by reading the following specification and subjoined claims and by referencing the following drawings in which:

FIG. 1 is a side view of an aircraft incorporating the variable density stitched composite energy absorbing subfloor structure of the present invention;

FIG. 2 is a perspective view of a variable density stitched composite energy absorbing panel used in the subfloor structure of FIG. 1;

FIG. 3 is a perspective view of a variable density stitched composite energy absorbing element used in the panel of FIG. 2;

DETAILED DESCRIPTION OF THE PREFERRED EMBODIMENTS

Figure 4:
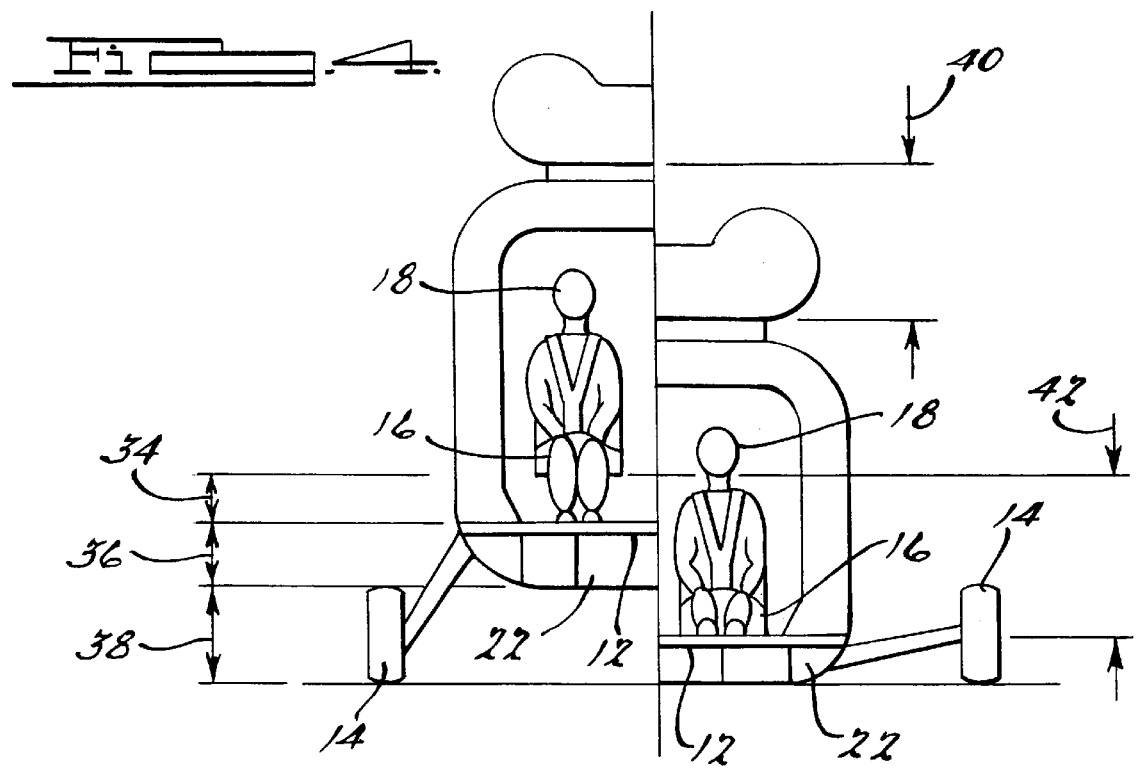
FIG. 4 is a schematic illustration showing an aircraft before and after impact and illustrating the crash energy absorption system incorporated therein.

The present invention is directed towards a variable density stitched composite structural element for energy absorption. According to the present invention, a composite panel for an aircraft substructure or the like is provided with a stitch pattern which varies in density from a first end of the panel to an opposite second end. The lower portion of the panel, which first contacts the ground in a crash impact, has relatively low-density stitching. This ensures that the crushing process is initiated at relatively low loads without precipitating any instability of the panel. The density of the stitching then gradually increases along the length of the panel to achieve the desired load-crushing characteristics.

Turning now to the drawing figures, FIG. 1 illustrates an aircraft incorporating the teachings of the present invention generally at 10. Although the aircraft 10 is a helicopter, one skilled in the art will appreciate that the teachings of the present invention can be equally incorporated into a fixed wing aircraft or other vehicles in which energy absorption during a crash impact is desired. The aircraft 10 includes a fuselage 12, landing gear 14, and seats 16 coupled to fuselage 12. Seats 16 support a pair of occupants 18 above floor 20. An energy absorbing subfloor structure 22 is interposed between the floor 20 and the fuselage 12.

Referring now to FIG. 2, a panel 24 from the energy absorbing subfloor structure 22 of FIG. 1 is illustrated. The panel 24 is preferably formed of a composite material such as carbon/epoxy and is vertically oriented relative to the aircraft 10. The panel 24 includes a generally planar back wall 23 and a plurality of laterally spaced apart ribs 25 orthogonally projecting from back wall 23. As shown in FIG. 3, the panel 24 includes a plurality of adjacently arranged u-shaped elements 27.

Referring to FIGS. 2 and 3 collectively, a thread 26 is stitched through the elements 27 of the panel 24 including the back wall 23 and ribs 25. The thread 26 is preferably formed of glass. As can be seen, thread 26 is stitched through panel 24 in a preselected pattern such that it varies in density from a first end 28 of the panel 24 to an opposite second end 30 of the panel 24. First end 28 is the end of panel 24 that is most likely to impact the ground first during a crash. Conversely, second end 30 is the end of panel 24 that is most likely to impact the ground last during a crash.

The threads 26 are preferably disposed through the panel 24 in a pattern of parallel rows. Adjacent rows within the pattern are preferably spaced apart by progressively decreasing amounts from the first end 28 to the second end 30 as shown by arrow 32. Further, the number of stitches per unit length (e.g., inch) in each row preferably increases from the first end 28 to the second end 30. The variable density pattern of the threads 26 essentially subdivides panel 24 into a plurality of zones, each of the zones including a different density of the pattern. If desired, the variable row spacing or variable number of stitches per row may be employed independently of the other.

During a crash impact, the first end 28 of the panel 24 contacts the ground prior to the remainder of the panel 24. The thread 26 in this portion of the panel 24 has a relatively low density of stitching (either due to spacing or number of stitches or both). This ensures that the crushing process is initiated at relatively low loads without precipitating any instability of the panel 24. The density of the stitching of the threads 26 then gradually increases along the length of the panel 24 as shown by arrow 32 to achieve the desired load crushing characteristics.

By adjusting the variation of the stitching density along the length of the panel 24 through row spacing or number of stitches per row or both, it is possible to achieve either a constant crushing load or a load that gradually increases with the amount of crushing of the panel 24. Constant load-crushing is desirable to achieve the maximum possible energy absorption. However, gradually increasing load-crushing is desirable for applications where the crushing load factors can be tailored to the severity of the crash impact. For example, during hard landings and less severe crash impacts, the crushing loads would be lower thus protecting aircraft subsystems including the mission equipment package. However, during more severe impacts, the crushing load and the energy absorption capability increases resulting in increased crash protection for the occupants.

Turning now to FIG. 4, the impact of a crash is absorbed by the landing gear 14, subfloor structure 22, and seat 18. The seat 18 provides a first crushing zone 34, the subfloor structure 22 provides a second crushing zone 36, and the landing gear 14 provides a third crushing zone 38. The large masses of the aircraft, generally shown at 40, are slowed down by the collapse of the landing gear 14 and fuselage 12. The occupants 16 are slowed down at 42 by the collapse of the landing gear 14, fuselage 12, and seat 18. As such, a systems approach to crash absorption is maintained.

Figure 5:
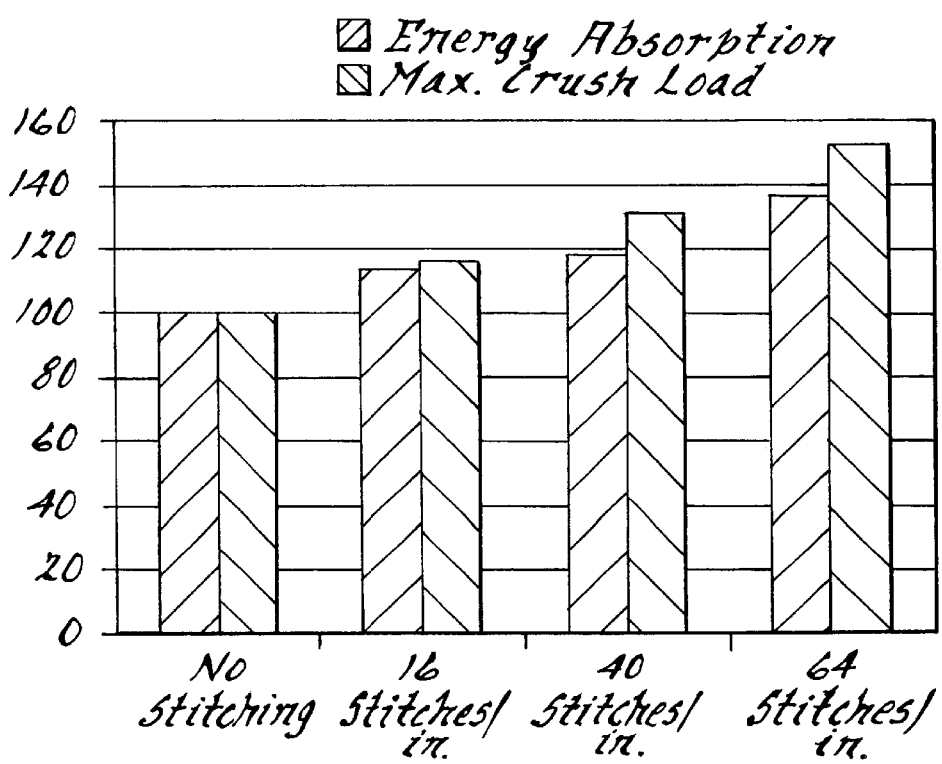
FIG. 5 is a graph illustrating crushing load and energy absorption versus stitching density.

Turning now to FIG. 5, test panels with various stitching densities were crushed to substantiate the present invention. The test data is for AS4/3501-6 carbon/epoxy material with $[0/+45/-45/90]_3$ lay-up at various stitching densities using glass threads. The test data, normalized with an unstitched specimen, indicates that the crushing load and energy absorption capabilities vary with the density of the stitching. The crush loads and the energy absorption capabilities increase by up to 152 and 137% respectively for the stitched specimens in comparison to the unstitched specimen.

The test data clearly shows that the variable stitching density utilized by the present invention enables the energy absorption capability of panels to be tailored to meet design requirements and the crush loads to be tailored such that elastic instability of the structure is avoided. The present invention may find particular usefulness in rotary wing aircraft with composite fuselage structures by providing reduced weight while increasing energy absorption capability. The present invention may also find usefulness in civil rotor craft, transport and general aviation aircraft, as well as the automotive industry.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. An aircraft comprising:

a fuselage;

a floor spaced apart from said fuselage; and an impact absorbing structure disposed between said fuselage and said floor, said impact absorbing structure including a plurality of vertically oriented composite panels, each of said panels having a thread stitched therethrough in a pattern varying in density from an initial impact portion of said panel to a final impact portion of said panel.

2. The aircraft of claim 1 wherein said pattern further comprises a low density pattern proximate said initial impact portion and a high density pattern proximate said final impact portion.

3. The aircraft of claim 2 wherein said low density pattern progressively transitions into said high density pattern.

4. The aircraft of claim 3 wherein said low density pattern and said high density pattern further comprise a plurality of rows of said thread stitched through said panels, said plurality of rows being spaced apart by progressively decreasing amounts from said initial impact portion to said final impact portion and including an increasing number of stitches per row from said initial impact portion to said final impact portion.

* * * * *